United States Patent Office 2,773,821
Patented Dec. 11, 1956

2,773,821

COMPOSITION FOR USE IN ELECTROPOLISHING

George H. Smith, Buffalo, N. Y., assignor to Electro-Gleam, Inc., Buffalo, N. Y.

No Drawing. Application June 12, 1956,
Serial No. 590,829

1 Claim. (Cl. 204—140.5)

This invention relates to an improved composition for use in connection with the polishing of certain metals by electrolytic action.

The electropolishing of metals has been carried out for a number of years but has not always been successful for the reason that most processes and compositions required a very careful maintaining of correct operating conditions and frequently slight variations from such compositions resulted in inferior work. Furthermore, such compositions were heretofore generally effective only on a few specific metals and would not operate successfully on all other metals.

Consequently, it is an object of this invention to provide an improved composition containing ingredients which cooperate with each other in such a manner as to enable the composition to operate successfully on a number of different metals and alloys.

My improved composition may be used effectively on iron and steels of various types, such as stainless steels and carbon steels, aluminum, nickel and alloys thereof. My improved composition includes inorganic acids such, for example, as orthophosphoric acid and sulphuric acid which have heretofore been used in electropolishing solutions or baths. These acids, when used by themselves are quite corrosive and etch the metal, so that they do not leave a bright finish on the same. Consequently, inhibitors are generally used with these acids. I have found that particularly good results can be obtained by uing a group of three inhibitors comprising hydroxyacetic acid, benzene sulphonic acid and toluene sulfonic acid, and the solution also contains a small amount of water.

The orthophosphoric acid which I preferably use is approximately 85 percent pure, the greater portion of the impurity being water. The sulphuric acid which I employ is preferably approximately 66° Bé. About 55 to 75 percent of the bath is made up of these acids, preferably about 30 to 40 percent of the orthophosphoric acid and 25 to 30 percent of the sulfuric acid.

The inhibitors include from 10 to 20 percent of hydroxy acetic acid. Other organic acids, such as citric acid or acetic acid may be used, but I have found that solutions containing hydroxy acetic acid are more stable and therefore are greatly preferred. I also use as additional inhibitors about 5 to 25 percent of benzene sulphonic acid and from 2 to 12 percent of toluene sulfonic acid. The composition consequently may contain from 5 to 15 percent added water i. e. in addition to water contained in the orthophosphoric acid.

It is necessary to maintain the solution at a concentration of 54.5 to 55.2 degrees Bé. at 160° F. and this concentration can easily be maintained by adding water if the solution becomes too concentrated, or by removing water, for example, by boiling, if the concentration is not sufficient. It is also possible to increase the concentration of the solution by adding fresh solution to the bath. When the concentration of the solution is maintained, the life of the solution is practically indefinite and it may be used repeatedly. The solution may be kept clean and operative, for example, by skimming off any grease or oil which may collect on the top of the bath and by removing from the bottom of the bath any material collected therein.

The solution may be used in the same manner as has heretofore been customary with similar solutions. The temperature of the solution, in order to obtain the best result, should be kept between 60 degrees to 90 degrees C., and the voltage and the time of the exposure of the metal articles to the treatment may vary, depending upon kind of metal and the amount of deposit to be removed from the metal articles. Voltages may vary from 6 to 12 volts and the amperage may vary between 60 to 200 amperes per square foot.

The electropolishing is carried out in a tank having a suitable lining or inner surface which is inert to the ingredients of the solution and which is provided with means for varying the temperature of the solution. The cathodes used may be of stainless steel or copper, and of course it is desirable to have the cathodes spaced two to four inches from the articles to be polished which constitute the anodes. Generally the articles to be polished are mounted on racks which may be readily placed into and removed from the tank; and the articles must of course be connected with the racks in such a manner as to form good contacts through which electric current flows.

In addition to polishing the articles, the solution also removes burrs or other small projections or irregularities from the surface of the articles and also removes grease, oils and similar materials, as well as surface blemishes such as due to corrosion, oxidation and the like. On parts which have been machined, cutting oils or lubricants are removed and will float on the solution where they can be readily skimmed off. Scale and other heavier particles which are removed will collect in the bottom of the treatment tank where they also can be removed.

The reactions of the ingredients are such that a high luster is produced on the metal articles. Some of these ingredients when used without others would produce a dull or gray finish, but other ingredients change this type of finish. To produce a bright surface, these latter ingredients by themselves would not be capable of removing other surface deposits from the metal.

If, for example, the solution is used for polishing carbon steels, it has been found that the temperature of approximately 185 degrees F. would be maintained during the processing to obtain the best results. The current passing to the metal under treatment should be such that there will be about 60 to 150 amperes per square foot. The cathodes may be of stainless steel or copper. Copper racks with Phosphor bronze contacts can be used, particularly if the articles under treatment are to be coated with clear lacquers or plastics. When the solution is first used, the first racks of high carbon steel should be subjected to approximately 8 volts for a period of 7 minutes, and this procedure should be maintained for about two hours. Production may then be continued and adjusted to a period of time less than 7 minutes to obtain the desired finish. As the solution is worked, it accumulates a metallic content which gradually increases its efficiency and its Baumé will rise accordingly, and it is permitted to rise to a reading of about 54.5 degrees and thereafter is maintained at a level of approximately 54.5 to 55.2 Baumé, determined at a temperature of 175 degrees F. Lower degrees of Baumé result in poor luster and a tendency to etch the metal and to increase the current consumption. Maximum brightness is obtained at 185 degrees to 190 degrees F. on high carbon steel. Low carbon steel reaches its maximum smoothness at 180 degrees to 190 degrees F. with the higher temperatures giving the brighter luster, with the voltage lowered to avoid etching. Generally speaking, high carbon steel is best polished at 6 to 8 volts and low carbon steel at 4 to 7 volts, and if etching occurs, the voltage should be lowered, but maximum deburring is achieved at the higher voltage range.

The time required for the electropolishing of steel depends, of course, on the amount of scale to be removed and the degree of levelling or deburring desired. Both high and low carbon steels that do not require much deburring may be polished in 3 to 5 minutes, while normal deburring requires from 5 to 7 minutes.

After articles have been electropolished as above described, they are rinsed with warm water for best results. The acid should be removed as rapidly as possible from the surface which has been polished.

For polishing aluminum, the same type of equipment as for steel is used, and the power required is such as to produce a current density of about 120 amp. per square foot at the start of the polishing cycle, and this amperage will drop rapidly to 25 to 50 amp. per square foot. For best results the temperature of the solution should be about 160 degrees F. and the voltage between 10 and 14 volts. For a bright finish, on most types of aluminum, two minutes of treatment is sufficient, but to increase the abrasion resistance, the polishing operation must be continued up to four minutes, after which the aluminum must be rinsed immediately to avoid a milky surface thereon. Preferably, after rinsing in soft water, the parts which have been treated should be air-dried and left standing at least 24 hours before further handling. The aluminum should be as free as possible from blemishes on the surface before treatment, since very little levelling of scratches occurs. Occasionally a passive or oxide surface on aluminum will not polish immediately until the current is reversed for about one-half minute, and then resuming the normal polishing cycle.

With the foregoing examples of the treatment of steel and aluminum, it will be easily possible for anyone to employ the solution on Monel, inconel, nickel and nickel alloys.

The solution does not become deteriorated with use so long as the Baumé is maintained, by adding water when the solution becomes too concentrated, or by evaporating water from the same if it is not sufficiently concentrated. This is due to the fact that none of the ingredients is volatile. The solution during electropolishing also removes grease and cutting oils from the metal surfaces under treatment, as well as corrosion and oxidation.

It will be understood that various changes in the details and materials may be made by those skilled in the art within the principle and scope of the invention as expressed in the appended claim.

I claim:

A solution for use in electropolishing metals of a group consisting of iron, aluminum, nickel and alloys thereof, said solution containing from 30 to 40 percent of orthophosphoric acid, 25 to 35 percent of sulphuric acid and 10 to 20 percent of hydroxyacetic acid, 5 to 25 percent of benzene sulphonic acid, 2 to 12 percent of toluene sulphonic acid and from 5 to 15 percent of water.

References Cited in the file of this patent
UNITED STATES PATENTS
2,607,722    Kreml _____ Aug. 19, 1952